US009582375B2

(12) United States Patent
Bastawala et al.

(10) Patent No.: US 9,582,375 B2
(45) Date of Patent: Feb. 28, 2017

(54) METHOD AND SYSTEM FOR AUTOMATIC FAILOVER FOR CLIENTS ACCESSING A RESOURCE THROUGH A SERVER USING HYBRID CHECKSUM LOCATION

(71) Applicant: Oracle International Corporation, Redwood Shores, CA (US)

(72) Inventors: Mehul Dilip Bastawala, Sunnyvale, CA (US); Srinath Krishnaswamy, Fremont, CA (US); Nancy Reiko Ikeda, Los Altos Hills, CA (US); Lakshminarayanan Chidambaran, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 198 days.

(21) Appl. No.: 14/272,167

(22) Filed: May 7, 2014

(65) Prior Publication Data

US 2015/0324259 A1 Nov. 12, 2015

(51) Int. Cl.
*G06F 11/00* (2006.01)
*G06F 11/20* (2006.01)
*H04L 29/06* (2006.01)
*H04L 29/08* (2006.01)

(52) U.S. Cl.
CPC ............ *G06F 11/20* (2013.01); *G06F 11/203* (2013.01); *G06F 11/2038* (2013.01); *G06F 11/2046* (2013.01); *H04L 67/1097* (2013.01); *H04L 67/2814* (2013.01); *H04L 67/42* (2013.01); *G06F 2201/82* (2013.01); *G06F 2201/83* (2013.01)

(58) Field of Classification Search
USPC ........................................................ 714/4.11
See application file for complete search history.

(56) References Cited

U.S. PATENT DOCUMENTS

| | | | | |
|---|---|---|---|---|
| 5,696,895 A | * | 12/1997 | Hemphill | ............ G06F 13/4022 714/13 |
| 5,734,896 A | * | 3/1998 | Rizvi | ...................... G06F 9/466 |
| 5,774,668 A | * | 6/1998 | Choquier | ................ G06F 9/505 370/480 |
| 5,918,224 A | * | 6/1999 | Bredenberg | ........ G06F 12/0815 |
| 6,199,110 B1 | * | 3/2001 | Rizvi | ................ G06F 17/30348 707/999.01 |
| 6,490,610 B1 | * | 12/2002 | Rizvi | .................. G06F 11/2028 707/999.01 |

(Continued)

*Primary Examiner* — Kamini Patel
(74) *Attorney, Agent, or Firm* — Vista IP Law Group, LLP

(57) ABSTRACT

Some embodiments are directed to a method and apparatus for implementing an automatic failover mechanism for a resource. A client accesses a source through a first server using a first session. During the session, the client stores checksum information corresponding to data received via the session with the first server. When it is detected that the session between the first server and the client has failed, the client is automatically connected with second server that has access to the resource. The checksum information is transmitted from the client to the second server, where it is compared with checksum information calculated at the second server, so that a determination can be made as to whether the client can continue processing where it left off when connected to the second server.

30 Claims, 6 Drawing Sheets

(56) References Cited

U.S. PATENT DOCUMENTS

| | | | |
|---|---|---|---|
| 6,728,747 B1 | 4/2004 | Jenkins et al. | |
| 6,973,457 B1* | 12/2005 | Bastawala | G06F 17/3041 |
| | | | 707/770 |
| 7,032,089 B1* | 4/2006 | Ranade | G06F 11/2069 |
| | | | 707/999.202 |
| 2002/0143728 A1* | 10/2002 | Cotner | G06F 17/30595 |
| 2004/0181561 A1* | 9/2004 | Knox | G06F 17/30908 |
| 2006/0036616 A1* | 2/2006 | Bastawala | G06F 17/30457 |
| 2013/0066837 A1* | 3/2013 | Colrain | G06F 17/30371 |
| | | | 707/674 |
| 2013/0066952 A1* | 3/2013 | Colrain | G06F 11/1438 |
| | | | 709/203 |
| 2013/0066955 A1* | 3/2013 | Neel | H04L 67/146 |
| | | | 709/203 |
| 2014/0040346 A1* | 2/2014 | Yanagihara | G06F 17/30902 |
| | | | 709/203 |

* cited by examiner

FIG. 4A

| Row | Data | | | | | Checksum | Cumulative Checksum |
|---|---|---|---|---|---|---|---|
| 1 | 3 | 5 | 10 | 4 | 6 | 30 | 30 |
| 2 | 6 | 9 | 3 | 11 | 7 | 36 | 66 |
| 3 | 12 | 15 | 6 | 5 | 3 | 41 | 107 |
| 4 | 15 | 3 | 1 | 16 | 10 | 45 | |
| 5 | 2 | 10 | 4 | 7 | 2 | 25 | |

FIG. 4B

| Row | Data | | | | | Checksum | Cumulative Checksum |
|---|---|---|---|---|---|---|---|
| 1 | 3 | 5 | 10 | 4 | 6 | 30 | 30 |
| 2 | 12 | 15 | 6 | 5 | 3 | 41 | 71 |
| 3 | 6 | 9 | 3 | 11 | 7 | 36 | 107 |
| 4 | 2 | 10 | 4 | 7 | 2 | 25 | |
| 5 | 15 | 3 | 1 | 16 | 10 | 45 | |

METHOD AND SYSTEM FOR AUTOMATIC FAILOVER FOR CLIENTS ACCESSING A RESOURCE THROUGH A SERVER USING HYBRID CHECKSUM LOCATION

CROSS-REFERENCE TO RELATED APPLICATIONS

The present application is related to U.S. Pat. No. 6,490,610, filed May 30, 1997, entitled "AUTOMATIC FAILOVER FOR CLIENTS ACCESSING A RESOURCE THROUGH A SERVER," issued Dec. 3, 2002 and to U.S. Pat. No. 6,728,747, filed May 10, 2002, entitled "METHOD AND SYSTEM FOR IMPLEMENTING FAILOVER FOR DATABASE CURSORS," issued Apr. 27, 2004, both of which are hereby incorporated by reference in their entireties.

BACKGROUND

A typical client-server database system includes a client, a database server, and a database. The client portion includes two main components, a database application and a client driver interface. The database application issues database language commands (e.g., SQL (Structured Query Language) commands), and provides an interface to a user through a keyboard, screen, and/or pointing devices such as a mouse. The client driver interface provides the connection and communication interface between the client and the database server.

A specific connection between a particular client and a particular database server may be termed a database session. The database server responds to the database language commands (e.g., SQL queries) sent from the client by executing database operations for accessing and manipulating a physical database. Contained within the database server is session state data which may reflect the current state of the database session.

To initiate a database session, a "log on" procedure may be performed to establish a new database session by connecting a client with a database server. Normally, the database session lasts from the time the user connects until the time the user disconnects or exits the database application. However, if a database session failure occurs, either through a failure of the connection between the client and database, or the failure of the database or database server, the connection between the client and the database server is lost. When this occurs, the user will observe a visible interrupt in his service as access to the database is terminated. To continue accessing the database, the user must reconnect a client to an active database server. This may require human intervention to manually log back onto the system to establish a new database session.

Besides requiring human intervention to manually log back onto the system, the failure of a database session creates other significant problems to the user. Because the logon process creates a new database session, all previous queries that were not complete at the time of the failure are lost. Thus the user must resubmit all lost queries once the connection to the database is reestablished.

Based on the foregoing, it is desirable to provide a mechanism for handling the failure of a database session without requiring someone to perform manual reconnection steps. Additionally, it is also desirable to be able to restore session state data after the occurrence of a database session failure.

SUMMARY

Some embodiments are directed to a method and apparatus for implementing an automatic failover mechanism for a resource. In some embodiments, when it is detected that a connection between a first server and the client has failed, the client is automatically connected with a second server that has access to the resource. After automatically connecting the client, the client accesses the resource through the second server. The client stores checksum information corresponding to data received via the session with the first server so that a determination can be made as to whether the client can continue processing where it left off when connected to the second server. In some embodiments, the determination is made by transmitting checksum information from the client to the second server, where it is compared with checksum information calculated at the second server.

BRIEF DESCRIPTION OF THE FIGURES

The present invention is illustrated by way of example, and not by way of limitation, in the figures of the accompanying drawings and in which like reference numerals refer to similar elements and in which:

FIGS. 4A and 4B illustrates a diagram illustrating how checksums can be utilized for completing select commands that were interrupted by a database session failure in accordance to some embodiments;

DETAILED DESCRIPTION

Figure 1:
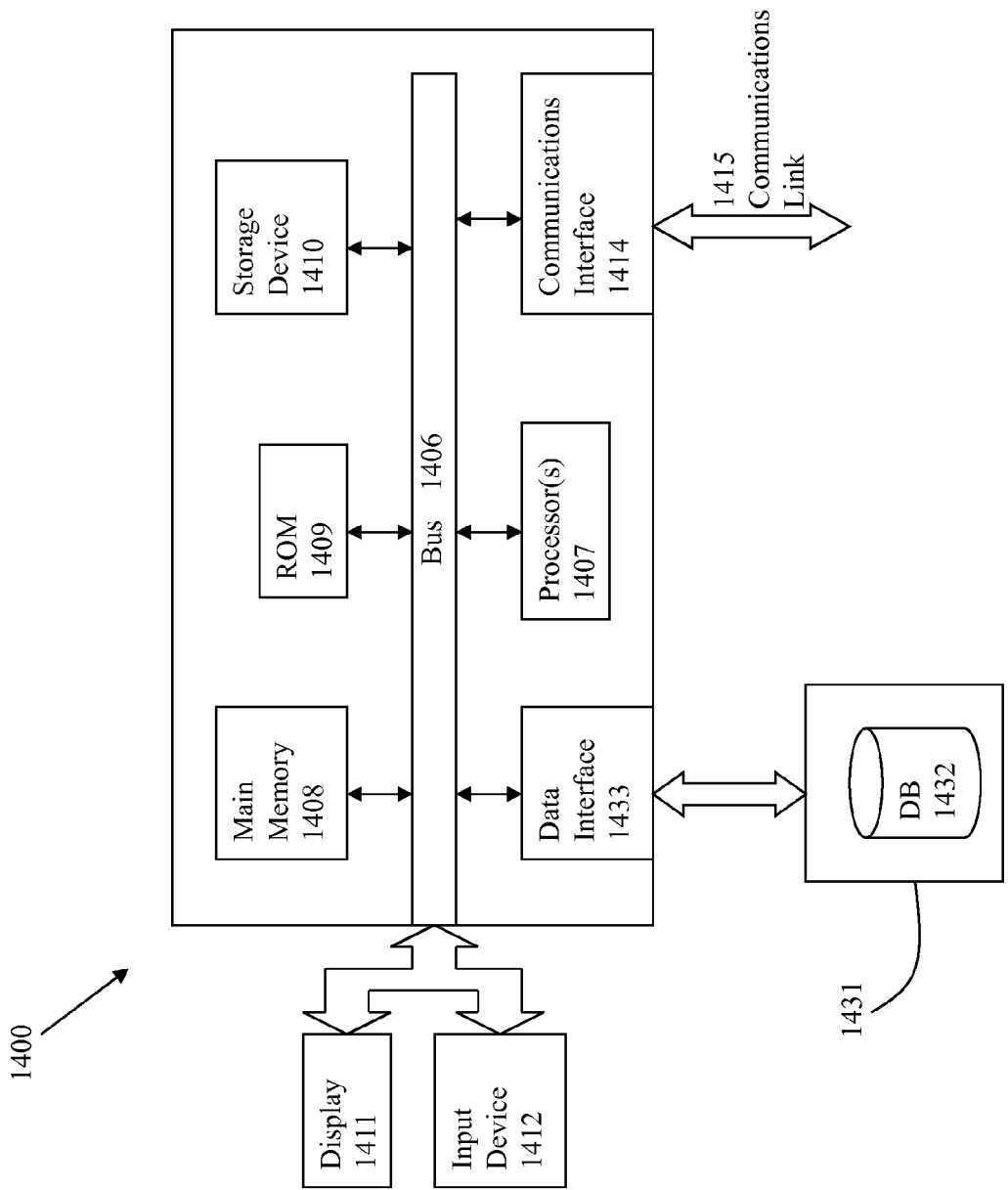
FIG. 1 illustrates a block diagram of a computer system that may be used to implement the present invention.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of mobile applications that receive additional role and environment information. It is noted, however, that the invention is not limited in its scope to these types of applications and this set of additional information, and indeed, may be applied to other types of applications and information as well.

A method and apparatus for implementing an automatic failover mechanism for a resource is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Automatic Failover

An automatic failover system is a mechanism that can detect a failed connection between a client and a database server and automatically and transparently create a new database session by reconnecting the client to an active database server. The automatic failover mechanism can eliminate the burden of manually re-logging onto the database system whenever a database session failure occurs. In addition, the automatic failover mechanism can provide a method for completing database queries that were interrupted by the database session failure.

Figure 2:
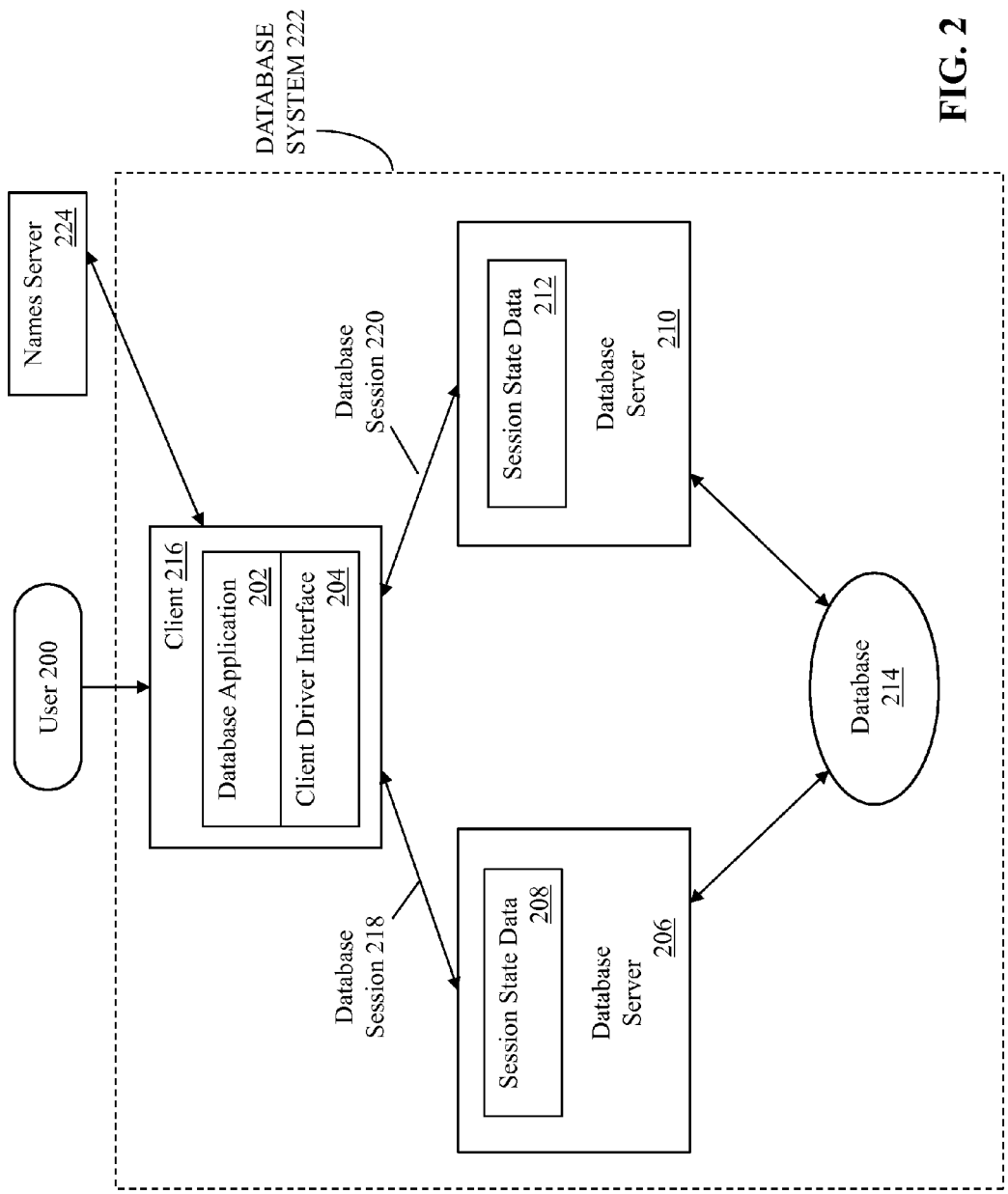
FIG. 2 illustrates a block diagram of a database system in which a client is connected to a database server to provide access to a database in accordance to some embodiments.

FIG. 2 is an illustration of a database system 222 that supports automatic failover according to some embodiments. Database server 206 and database server 210 represent database servers that can provide access to a particular database 214. Database server 206 may also be referred to as a primary server node, while database server 210 may be referred to as a backup server node.

Client 216 includes database application 202 and client driver interface 204. Database application 202 provides user 200 an interface into database 214 by generating database queries based on input from user 200 and displaying to user 200 data retrieved from database 214 in response to the database queries.

In some embodiments, client driver interface 204 is initially connected to and communicates with database server 206 through database session 218. Session state data 208 contained within database server 206 reflects the current state of database session 218. While the present embodiment illustrates failover with regards to single database session 218 between client driver interface 204 and database server 206, it is understood that in other embodiments, a client driver interface 204 may maintain multiple database sessions with a database server 206.

If a failover occurs, such as through a connection failure between client driver interface 204 and database server 206, or a failure of database server 206 and/or database 214, database session 218 will be terminated. The client 216 may start a new database session 220 in order to continue accessing database 214 (or a backup or restored version of database 214 in the case of database failure) through database server 210. The state of databases session 220 is reflected by session state data 212. A names server 224 may contain active database server addresses that may be used by clients to access database 214, to be used by client 216 to identify a database server (e.g., database server 210) to connect to in order to continue accessing database 214 following failure of database session 218.

It is understood that although FIG. 2 illustrates database servers 206 and 210 as two different database servers, in some embodiments, database server 206 and database server 210 may be the same database server. This may occur if the cause of failover was not related to a failure of database server 206 or a connection to database server 206 (e.g., failover caused by failure of database 214), allowing client 216 to begin a new database session 220 through the same database server. Alternatively, if the termination of database session 218 was caused by a failure of database server 206, client 216 may still be able to reconnect to database server 206 through a new session 220 if database server 206 has recovered.

Automatic Failover Sequence

Figure 3:
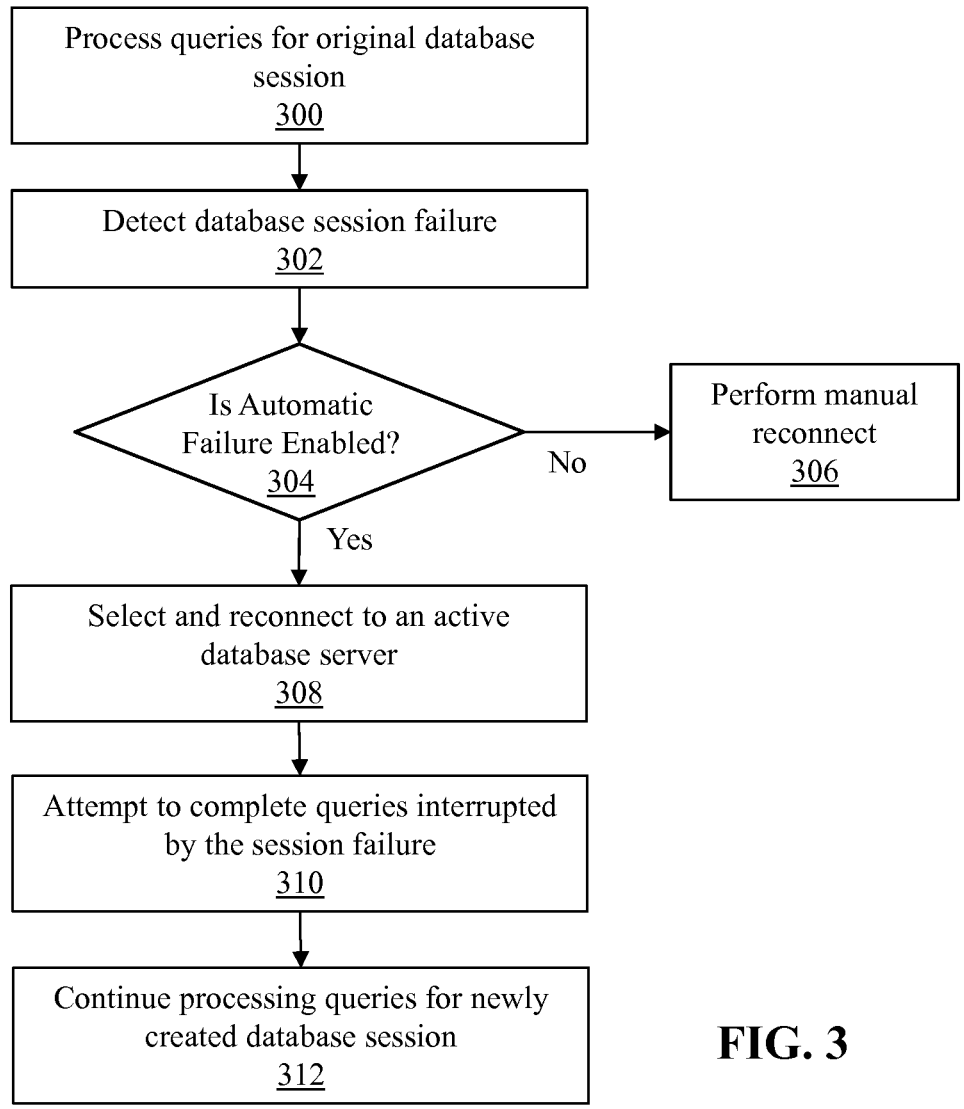
FIG. 3 illustrates a flow chart illustrating steps performed in response to a database server failure in accordance to some embodiments.

FIG. 3 is a flow diagram illustrating the manner in which an automatic failover mechanism may be implemented according to one embodiment of the invention. According to one embodiment as described in FIG. 3, the configuration of database system 222 before an occurrence of a database session failure is such that client 216 only has access to database 214 by way of database server 206 and database session 218. User 200 accesses database 214 by interacting with the user interface, causing client 216 to submit queries to database 214 through database session 218. In some embodiments, client 216 may directly expose the user interface to user 200. In other embodiments, client 216 may instead be a middle tier system (e.g., an HTTP server) which receives requests from user 200 from across a network (e.g., user 200 accesses a user interface at a browser, wherein the browser sends requests to client 216 based upon inputs at the user interface).

At 300, client driver interface 204 is configured to process queries that correspond to input from user 200, and conveys these queries to database server 206 through database session 218. In some embodiments, client driver interface 204 maintains a record of the state of every query sent over session 218 that has not completed. If database session 218 fails, this record enables client driver interface 204 to transfer and reestablish the state of any queries interrupted by the failure onto database server 210 and session state data 212. Once database server 210 and session state data 212 are initialized, client driver interface 204 would thus be able to attempt to continue processing the interrupted queries by communicating the queries through database session 220.

At 302, client driver interface 204 detects a failure of database session 218 that results in the connection between client 216 and database server 206 being lost. Various techniques may be used to allow client driver interface 204 to detect a failure of database session 218. For example, according to one embodiment, client driver interface 204 issues a callback request when initiating the connection to database server 206 through database session 218. The callback request notifies client 216 via client driver interface 204 when database session 218 fails. In an alternate embodiment, client driver interface 204 detects a failure of database session 218 by maintaining a timer which times out when database server 206 fails to respond within a specified amount of time. Client driver interface 204 may then verify that database session 218 actually failed and that the interface did not time-out for another reason.

At 304, client driver interface 204 verifies that automatic failover is enabled. In one embodiment, user 200 can configure whether or not automatic failover is performed on the failure of database session 218. If user 200 has not configured automatic failure and database session 218 fails, manual steps will be required at 306 to log back onto database system 222. When manually logging back into the database session, session state data 208 is lost and cannot be restored. Otherwise, if user 200 has configured automatic failover, the system proceeds to automatic failover at 308, wherein a database server (e.g., database server 210) is selected to reestablish access to database 214. Various techniques may be used for selecting a database server that allows access to the same resource (database 214) that was being accessed during the failed session. Names server 224 may be used to select the new active database server 210. In some embodiments, the new active database server 210 may be the same database server as database server 206 used by the previous session 218, or may be a different database server. In some embodiments, the backup server 210 can be explicitly configured by the administrator via a connect-descriptor or via a configuration file that client 216 has access to. In some embodiment, a restored or backup version of database 214 may be accessed instead of database 214 itself.

At 310, the client driver interface 204 attempts to continue the processing of any queries that were interrupted by the failure of database session 218 on the new database session 220. In one embodiment, client driver interface 204 maintains a record of the current queries being performed, so that client driver interface 204 can attempt to continue processing the interrupted queries on database server 210 once database session 220 is established. Because client driver interface 204 can automatically resubmit any interrupted query, the process can be transparent to user 200 as manual steps will not be required to resubmit the information.

Because the information in a database is constantly changing, a user cannot normally be guaranteed to receive the same data from one query to the next, even if both queries contain the same select attributes. Thus, results returned in response to the execution of a query reflect a particular snapshot of the database (i.e. the database at a specific instance in time).

When a query is executed, a snapshot or state of the database during the execution of the query is determined (e.g., using a time stamp or sequence number). This snapshot represents a specific state of the database and may allow a database server to retrieve consistent data, even as information in the database is modified. The snapshot used during the processing of one query may be used by a database server to retrieve the same information when executing subsequent queries. However, although using the same database snapshot to select separate executions of a query may allow the two executions to return the same information, the order in which rows are returned cannot be guaranteed. In other words, the row order of data returned by a query is not deterministic. In addition, it is understood that some queries may not be repeatable even with a database snapshot. These may include queries for instance or session specific data.

To continue processing an interrupted query, the client driver interface 204 must be able to determine which rows of data were previously received by the database application 202 from the failed database session 218, and whether the remaining rows returned from a subsequent execution of the query on the new database session 220 will present same query results to the database application 202 assuming failover did not happen. In some embodiments, this determination may be accomplished through the use of checksums, described in more detail in FIGS. 4A-B and FIG. 5. If it is determined using the checksums that the remaining rows from a subsequent execution of the query on the new database session 220 will present the same query results to the database application 202, then the previous rows retrieved prior to the failure may be retained. Else, the previous rows must be discarded and the query re-executed or reprocessed in its entirety. Once the client has attempted to continue processing the interrupted queries, the client may, at 312, continue to process new queries to the database through the new database session 220.

Checksum Calculation

Figure 5:
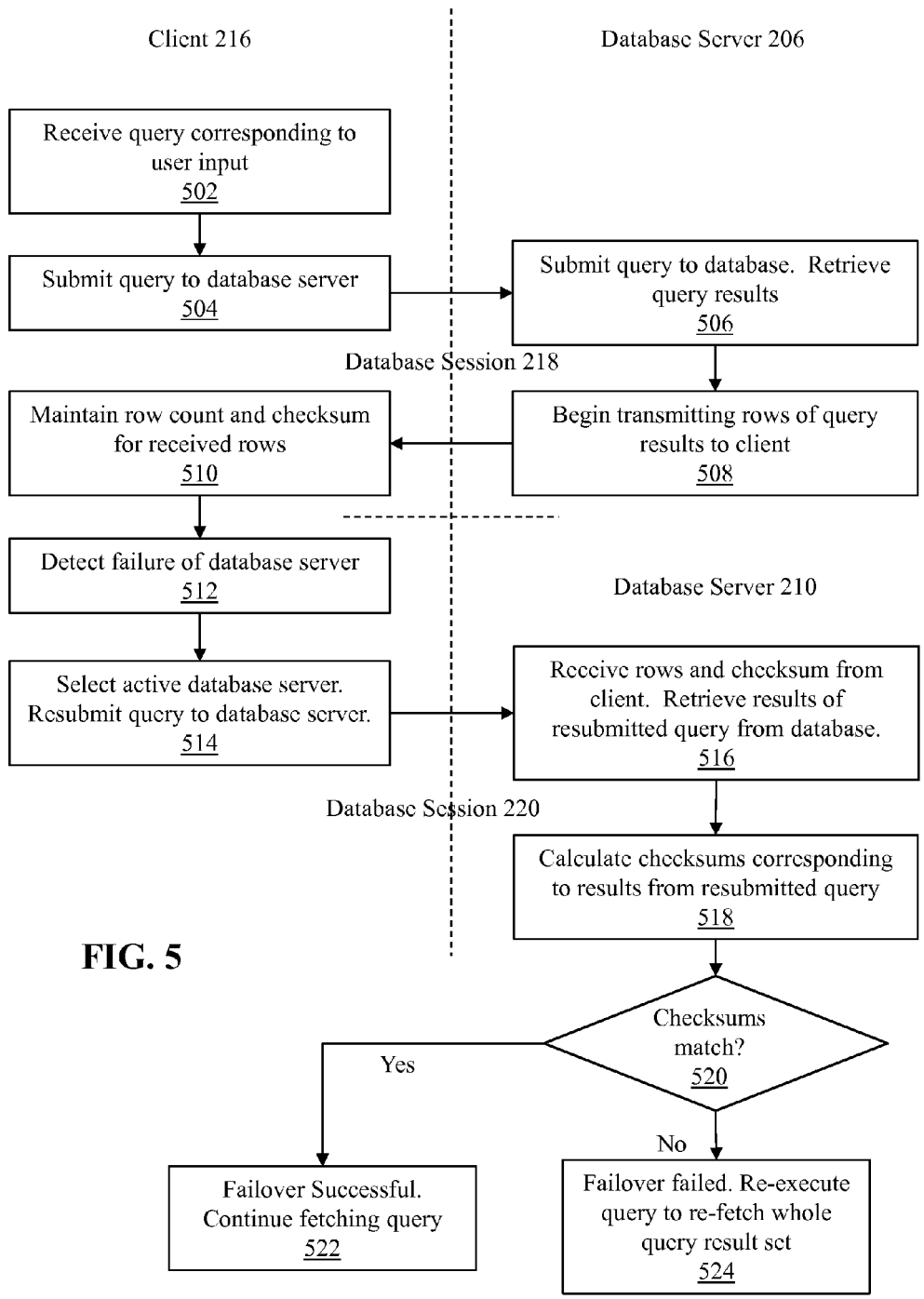
FIG. 5 illustrates a flowchart of a process for implementing failover in accordance with some embodiments.

FIGS. 4A-B and FIG. 5 illustrate an embodiment in which checksums can be utilized to enable a client to continue processing a query interrupted by a failover. According to one embodiment, whenever a client requests a query to be executed by a database server, the database server returns to the client a snapshot of the database used to process the particular query. The database snapshot is stored by the client and can be used to increase the likelihood that a subsequent query will return the same information as the previously executed query, as long as both queries employ the same attributes. In some embodiments, the requesting of queries and storing of database snapshots is done at the client driver interface.

In addition to the snapshot, the client calculates and maintains a first checksum for the received data. In some embodiments, the first checksum comprises a row count and a first cumulative row checksum. The row count indicates the number of rows successfully received by the client driver interface in response to the initial execution of the query prior to failover. The first cumulative row checksum is a cumulative checksum of the received rows. If a database session fails while executing a query, the row count and first cumulative row checksum are used to determine if a subsequent execution of the query on a new database session can be used to present the remaining query results from the point of interruption, or if the previously received results from the previous database session prior to interruption must be discarded.

FIG. 5 illustrates a flowchart of a process for implementing database session failover using a hybrid checksum approach in accordance with some embodiments. At 502, client driver interface 204 receives a query to be processed on database 214. The query may have been generated by a database application 202 in response to user input. At 504, client driver interface 204 submits the query to database server 206 for execution through database session 218.

At 506, database server 206 submits the query to the database and retrieves the query results. FIG. 4A illustrates data 422 which may be retrieved by database server 206 in response to the query. In addition, database server 206 may identify or create a snapshot of the database associated with the state of the database at the time of query execution.

At 508, database server 206 then begins transferring rows of query data back to client driver interface 204. For example, data 418, corresponding to a portion of query data 422, may be transmitted from database server 206 to client driver interface 204, which may then be delivered to database application 202 to be viewed by the user. As data 418 is received from database server 206, client driver interface 204 calculates/maintains a row count 408 and a first cumulative checksum 430.

As illustrated in FIG. 4A, data 422 represents queried data for the initial query, which in the illustrated example comprises five rows of data. Data 418 represents data that has been returned to client driver interface 204, while data 420 represents the rows of data that have not yet been returned to client driver interface 204. Cumulative checksum 430 is the cumulative row checksum of data 418 calculated by the client, and row count 408 is the number of rows of data that were returned to client driver interface 204.

In one embodiment, cumulative checksums (C) are calculated according to the following approach:
Initially C=0
When adding rows x . . . y to existing cache with rows
  1 . . . (x−1)
  For (row i from x . . . y)
    C=C+checksum(column values of row i);
In the above approach, "checksum" is an example of a checksum function and "column values of row i" is an argument of the "checksum" function.

In the example embodiment, the checksum for the first row of data received prior to failover has a value of "30," and therefore the cumulative checksum for the first row of data is also "30". The checksum for the second row of data is "36," resulting in a cumulative checksum of 66 (i.e., prior cumulative checksum of 30 plus current checksum value of 36). The checksum for the third row of data is "41," resulting in a cumulative checksum for the third row of 66+41=107. After the third row is successfully transmitted to the client, the client will maintain a row count of "3" to indicate that three rows of data have been successfully transmitted, and will also maintain the cumulative checksum value of "107" that is associated with a row count of 3.

At 512, client driver interface 204 detects a failure of database session 218 that causes the initial query to be interrupted before client driver interface 204 is able to receive all of the queried data. For example, in the example illustrated in FIG. 4A, only data 418 of the total queried data 422 has been received by the client, with the remaining data 420 having not yet been transmitted to the client at the time of failure. It is understood that in some embodiments, a single database session may process multiple queries at the same time, and a database session failure may interrupt multiple queries.

At 514, client driver interface 204 selects an active database server to connect to (e.g., database server 210) through a new database session 220, and attempts to continue processing the interrupted query from the point of interruption by resubmitting the query to database server 210. In addition, the client driver interface 204 will submit to database server 210 the stored database snapshot, row count 408 and first cumulative checksum 430. In some embodiments, row count 408 and first cumulative checksum 430 may be formatted as a tuple for storage and transmission.

At 516, database server 210 executes the resubmitted query using the received snapshot of the database associated with the query, and retrieves the query results. At 518, as the resubmitted query is executed and rows of data are fetched by database server 210, the number of returned rows is counted and a second cumulative row checksum is maintained.

As illustrated in FIG. 4B, data 424 depicts the data for the resubmitted query using the stored database timestamp retrieved database server 210. Data 416 represents the first three rows of data of data 424, while data 414 represent the last two rows of data for the resubmitted query. Second cumulative checksum 432 represents the cumulative row checksum of data 416, corresponding to the first three rows of data 424 received after executing the resubmitted query.

At 520, when the number of rows returned equals the number of rows previously returned, indicated by row count received from the client driver interface 204, the second cumulative row checksum 432 is compared with the previously calculated first cumulative row checksum 430 to determine whether the rows returned in response to the re-execution of the query are the same as the rows that were previously received by the client. If so, then the results returned by the resubmitted query are determined to be the same as the results previously returned by the initial query, and the results of the resubmitted select command may continue to be fetched to continue processing from the point of interruption.

If the comparison is successful, then recreation of the specific query result for the query being executed on the new database server is considered successful at 522, meaning that the client driver interface 204 does not have to discard the previous result data received prior to the failover, and that query results can continue to be retrieved from the point of interruption. In the current example, the row order of data 418 does not match the row order of data 416. Specifically, it is noted that the second and third rows are reversed in data 418 as compared to the same rows in data 416. However, the cumulative row checksum at row three for data 424 is "107", which is the same as the cumulative row checksum for data 422 at row three, even though a different ordering of rows exist between the two sets of data. After the failover, the cached row count and cumulative row checksum at the client is compared against the cumulative row checksum for the same row count at the backup server node, which in the present example are identical. If the client does not require order-dependency for the rows in the result set, then processing can continue after the interruption using data 424 from the backup server node, because the client driver interface 204 is assured that data 414 represents the two rows of data that were not returned to client driver interface 204 before database session 218 failed (data 420). Thus, in this instance, client driver interface 204 does not have to discard the previously received data 418, and can continue processing the interrupted query and retrieve only those rows of data that were not previously returned when database session 218 failed (data 414).

However, if cumulative row checksums 430 and 432 are not equal, client driver interface 204 cannot continue processing the query from the point that database session 218 failed. In this case, the process proceeds to 524, where an error may be returned to the client informing the user that a failure has occurred, and that the previously received query data 418 cannot be used and should be discarded. In addition, database server 210 may redeliver all rows of data from the resubmitted query (data 424) to client drive interface 204.

There are a number of different conditions in which the checksum comparisons may fail. For example, cumulative row checksums 430 and 432 may not be equal if the row data corresponding to checksum 430 is different from the row data corresponding to checksum 432. In addition, in some embodiments, the client or server may detect if an interrupted query is a non-repeatable query (e.g., the query involves instance specific data, session specific data, or other non-repeatable data). If the interrupted query is non-repeatable, then the checksum comparison may be configured to automatically fail (e.g., by setting checksum 432 to an impossible value, such as a negative number).

In some embodiments, when cumulative checksums 430 and 432 are not equal, client driver interface 204 instead notifies user 200 that a database session failure occurred and that the interrupted query cannot be completed. User 200 must then resubmit another query with the corresponding attributes.

Hybrid Checksum Location

The configuration of calculating the first checksum 430 at the client 216 and the second checksum 432 at the database server 210 servers is preferred because it reduces the amount of processing required by the database servers, as well as the amount of network traffic caused by transferring rows of data that will not be seen by the user between the client and database servers.

For example, if second cumulative row checksum 432 were to be calculated at the client 216 instead of on database server 210, then the retrieved rows up to the row count (rows 416) must be transferred from database server 210 to the client driver interface 204. These are rows of data that will never be seen by the user 200, and they are typically only used to calculate second cumulative row checksum 432, and discarded regardless of whether the failover is successful. For example, if the failover is successful, the client continues processing using the previously retrieved rows from the previous database session prior to interruption, and discards the transferred rows. As there may be many client processes connected to a database server, each having a plurality of client sessions, this may result in a very large number of rows being transferred between the database server 210 and client 216 that will never been seen by the user 200.

For example, if there are 50 client processes connected to a database server, each having 100 client sessions, with each session having 4 SQL queries in progress at the time of failover, with an average of 70 rows per query seen by users of the client sessions prior to failover, this would result in 50*100*4*70=1.4 million rows of data needing to be sent from the new database server to the database client. Sending these rows through the network incurs costs for the database CPU, network traffic, and client CPU in order to read the rows.

In contrast, when second checksum 432 is calculated on database server 210 instead of at client 216, only the row count 408 and first checksum 430 for an interrupted query needs to be transferred over the network. In some embodiments, the row count and checksum may be expressed together as a tuple. Transferring a tuple for each interrupted query from the client 216 to database server 210 results in much lower network usage.

In addition, it is desirable for the first checksum 430 to be calculated on client 216, instead of at database server 206 and then transmitted to client 216. This is because while the second checksum 432 is only calculated during a failover in order to determine whether the interrupted queries may continue being processed at the new database session 220, the first checksum 430 may be calculated for every query processed by database session 218. Because a failover often cannot be predicted, a first checksum 430 is calculated for each query processed by database session 218 in case of a potential session failure.

In many database sessions, thousands or millions of queries may be processed before a failure occurs, which results in checksums being calculated for thousands or millions of rows in anticipation of being able to respond to a potential failure, the vast majority of which are never used due to those queries being executed to completion instead of interrupted by a session failure.

As a single database server may be host to multiple client devices, processes, and sessions, processing power on a database server is often scarce and resource expensive, and having to devote extra processing power on the database server to compute numerous checksums that will never be used is not desirable. Moreover after failover, clients would like to continue processing queries as fast as possible to minimize interruptions to client database applications. By calculating the first checksum on the client systems instead of on the database server, the amount of processing required by the database server is reduced. Instead, the processing is divided and performed by the individual client systems, where processing power is generally cheaper and/or more available. By reducing the amount of processing done on the database server, the database server may be able to service more clients and processes at once.

Canonical Format

When the first checksum is calculated on the client, and the second checksum calculated on the server, care must be taken to ensure that both checksums can be effectively compared. For example, the client and server may be different endian machines. This may result in the first and second checksums being expressed in different ways even when the same checksum algorithm is used to calculate both checksums.

A canonical or machine-neutral format may be specified for calculating and representing the checksum data that is independent of machine endian-ness, so that the first checksums calculated at the client may be compared to the second checksums calculated at the database server. For example, in some embodiments it may be specified that all checksum tuples will be processed using network byte order (big endian).

Failover for Order-Sensitive Result Sets and Scrollable Cursors

In many database systems, a cursor is an available resource for accessing or parsing query statements embedded within an application. A "cursor" is a handle to a query execution area, e.g., an area in memory in which a parsed database query statement and other information for processing the query statement is stored. Cursors enable a query statement to retrieve rows from a database table into a given result set, which can then be accessed, displayed, or operated upon. A cursor can often be utilized like a pointer to a specific row in a result set. When the cursor is active, operations can be performed against the specific row or group of rows to which the cursor is pointing.

In the above example illustrated in FIGS. 4A-B, the checksums for the query result set are order-insensitive, which may be used for sequential cursors. In a sequential cursor, the only allowed movement of the cursor is forward, starting at the first row retrieved by the query expression and ending with the last row. Each row of data in this approach is fetched, operated upon, and then released in sequential order. Since the sequential cursor can only move forward, it is only necessary to verify that a given set of rows previously seen by the client matches the same set of rows retrieved at the backup server, even if the order of rows differ. Because the cursor cannot move backwards, the client does not "care" that the order of rows previously seen may be different at the backup server node, as long as the actual rows are the same.

In contrast, scrollable cursors allow movement of the cursor in either the forward and backward directions, thereby permitting rows to be accessed in any order. In this approach, the cursor can be moved in any direction to access a row of data, even for data that was earlier fetched. Thus, when scrollable cursors are used, order-dependency is required, as the client may scroll back the cursor to access earlier-accessed rows of data.

In some embodiments implementing a scrollable cursor, a partial result set is cached at the client computer. If the cursor is scrolled in either the forward or backward directions, the partial result set cached at the client computer is first checked to see if requested data is present. If so, then the requested data is fetched from the client cache and the current position of the cursor is moved to the appropriate position in the result set. If the requested data is not present in the client cache, then it may be fetched from the database server, which may contain a cache storing a more complete result set. Additional details of an exemplary approach for implementing scrollable cursors are disclosed in U.S. Pat. No. 6,973,457, entitled "Method and System for Scrollable Cursors," filed on May 10, 2002, which is hereby incorporated by reference in its entirety.

Since scrollable cursors may be fetched in either direction, rows previously fetched by a client may need to exist in the same order at the backup server node to provide for a consistent set of data after a failover. An order-sensitive checksum approach is thus needed to guarantee with a high degree of approximation that the set of row/column values of rows fetched after failover is the same as the set of row/column values fetched before failover.

If order-dependency is needed after the failover, an order-sensitive checksum is maintained at the client instead of or in addition to a cumulative checksum. The order-sensitive checksum calculates a checksum value that is dependent upon the order in which values are processed. In other words, order-sensitive checksum values will differ if the order of the rows is different, even if the set of all row values processed by the checksum algorithm is identical. In one embodiment, order-sensitive checksums ($C_o$) are calculated according to the following approach:

Initially $C_o=0$

When adding rows x . . . y to existing cache with rows 1 . . . (x−1)

For (row i from x . . . y)

$C_o$=o_checksum($C_o$, column values of row i).

In the above approach. "o_checksum" is an instance of a checksum function with "$C_o$" and "column values of row i" as arguments. It is appreciated that unlike the cumulative checksum described above, the order-sensitive checksum is based upon both the values of the row data, and also on the checksums of previous rows.

Figure 6:
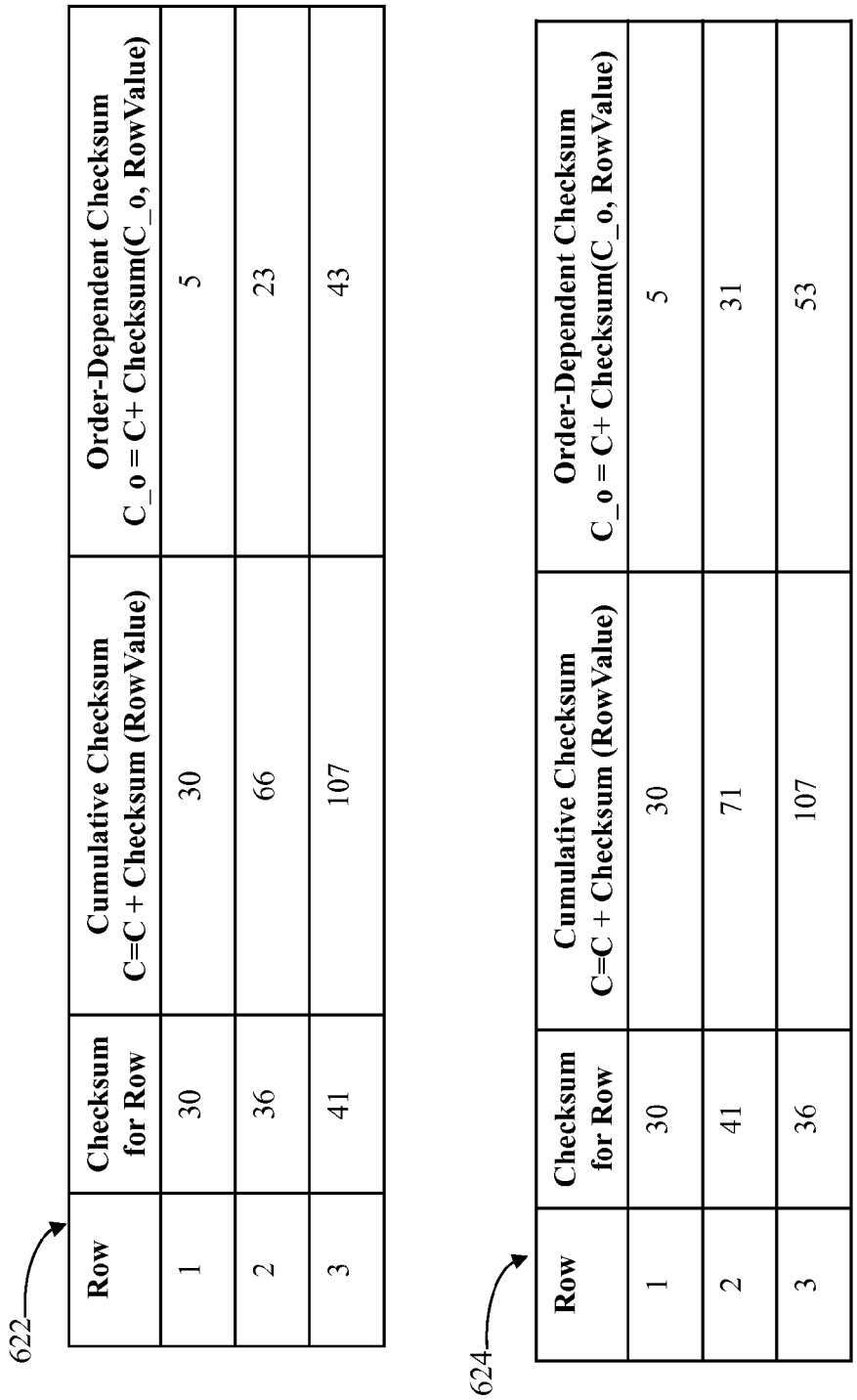
FIG. 6 illustrates a diagram of how order-sensitive checksums can be utilized to detect inconsistencies in row ordering for a re-executed query result set in accordance to some embodiments.

To illustrate this aspect according to an embodiment of the invention, FIG. 6 shows first data 622 responsive to the execution of a cursor. As shown, the cumulative checksums for data 622 are the same as those for FIG. 4. After the third row is successfully transmitted to the client, the client maintains a row count of "3" to indicate that three rows of data have been successfully transmitted. The order-sensitive checksum value for the third row will also be calculated at the client.

Consider if a failure occurs before any additional data is successfully transmitted to the client, and that data 624 represents the cursor re-executed at a backup server node after a failover. In data 624, the re-executed cursor returns the result set in a different order than exists in data 622. Specifically, it is noted that the second and third rows are reversed in data 624 as compared to the same rows in data 622. Because the three newly retrieved rows of data 624 are the same as the rows of previously retrieved data 622, the order inconsistency will not be detected be the cumulative checksum.

However, in the present example, the third row order-sensitive checksum for data 624 at the backup server node is different from the third row order-sensitive checksum value for data 622 that was cached at the client from the primary server node. Thus, if the order-sensitive checksum values are compared, then the order inconsistency can be immediately identified and the failover can fail and an error can be returned to the database application 202 by the client driver 204 notifying user 200 of the failure.

The process for failover with a scrollable cursor is similar to that illustrated in FIG. 5. As described above, rows of data received by the client driver interface in response to the execution of the scrollable cursor may be stored in a client cache, which are then delivered to the database application in response to requests by the user at the client user interface. In some embodiments, the client calculates and maintains a first order-sensitive checksum for rows received by the client driver interface. In other embodiments, the first order-sensitive checksum is calculated based on rows actually requested by the database application (in other words, seen by the user), and does not include rows received by the client driver interface but not yet requested by the database application.

In some embodiments, all rows up to the highest row requested by the client may be received and cached. For example, if a client executes a cursor that is to receive a total of 50 rows, and has requested display of rows 1, 3, 10, and 20, the client will retrieve rows 1 through 20 from the database server. If the cursor next requests to view a row less than the current highest cached row (row 20), such as row 18, only a local call is needed as the data corresponding to row 18 is already stored in the client cache. On the other hand, if the cursor requests to view a row higher than the current highest cached row (e.g., row 30), the client may retrieve all rows between the current highest row and the new highest row to be cached (e.g., rows 21 through 30).

In some embodiments where all rows up to the highest requested row are retrieved, the first order-sensitive checksum calculated by the client may be based upon all received rows up to the highest requested row. For example, if the client has retrieved and cached rows 1 through 20, then order-sensitive checksums may be calculated for rows 1 through 20, and the row count will be set at 20. For subsequent requests for rows less than the current highest row, there will be no need to update/recalculate the checksum, because checksums for up to row 20 have already been calculated. However, in this embodiment, in order for a failover to be successful, the order of rows received at the backup server node must match all 20 of the previously retrieved rows, despite the fact that only a subset of those rows has actually been seen by the client at the database application.

In some embodiments, the client may pre-fetch a number of rows in addition to those up to the highest row requested, in which case the client may calculate checksums up to the highest row plus the additional pre-fetched client cached rows (e.g., 25 rows, when the highest requested row is row 20).

In alternate embodiments, instead of tracking and calculating an order-sensitive checksum and row count based upon highest requested row, only checksums for specific rows seen by the client are maintained. For example, if the client has seen rows 1, 3, 10, 20, 15, 10, and 18 (the scrollable cursor allows some rows to be viewed multiple times), the client only calculates checksums for those specific rows. In some embodiments, duplicate rows (e.g., row 10) are removed for the purposes of calculating the checksum. In other embodiments, duplicate rows may be kept and included as part of the checksum calculation, which may be needed if the server is asked to playback the same sequence of fetch calls post-failover.

In this approach, the client maintains a list or array of rows (hereinafter, row list) instead of a row count, corresponding to the rows that were used to calculate the checksum. This avoids the client having to checksum all rows up to the highest row seen (e.g., 20) when only a subset of those rows has been actually displayed, making a failover more likely to be successful. This is because even though up to 20 rows have been retrieved and cached by the client, from the point of view of the user, only the rows actually viewed by the cursor need to be consistent for the failover to be successful, as it may not matter that rows not yet seen (e.g., row 2, 4, etc.) are different in the re-executed cursor. However, a row list may occupy more space in memory than a row count and may be more expensive to maintain.

In some embodiments where a row list is used, instead of retrieving all rows up to the highest requested row (row 20 in the above example), the client may be configured to only retrieve the requested rows not already in the cache. For example, if a client requests to view rows 15 through 20, instead of retrieving all rows up to the highest requested row (rows 1 through 20), the client may retrieve only the requested rows (rows 15 through 20). In some embodiments, the client may pre-fetch a number of additional rows in anticipation of future client requests (e.g., rows 12-24 instead of rows 15-20). Whether the client retrieves up to the highest requested row, only retrieves requested rows, or pre-fetches additional rows may depend upon the size of the client cache and the amount of data retrieved by the cursor.

In some embodiments, the order-sensitive checksum may only reflect rows that have been displayed to a user by the client (for example, rows 15-20 are used to calculate the order-sensitive checksum, while rows 12-14 and 21-24, which may be cached but not yet displayed, are not included in the checksum calculations). In other embodiments, checksum calculations may be performed for all rows received by the client, such that they take into account rows that have been displayed and also rows cached at the client but not yet displayed.

When the order-sensitive checksums are based upon only the displayed rows and not all cached rows, there may be a higher likelihood for a successful failover. This is because the number of rows that the order-sensitive checksums are based upon will be smaller, making it more likely that the order-sensitive checksums will match. However, in these embodiments, rows that have been cached but not yet displayed are discarded even if the failover is successful.

Thus, when a crash at the primary server node is detected, a failover occurs to a backup server node, where the client re-executes the scrollable cursor after establishing contact with the backup server node. During the re-execution of the cursor, the client communicates the row count and/or row list and first order-sensitive checksum to the server. While the backup server node retrieves results for the re-executed cursor, the second order-sensitive checksum for those rows is calculated. If a row count is used, then second order-sensitive checksum may be based upon the first n rows of data for the re-executed cursor, where n corresponds to the row count. In embodiments using a row list, the second order-sensitive checksum is calculated using the specific rows indicated in the received row list.

The value of the second order-sensitive checksum is compared against the value of the first order-sensitive checksum to determine if the set and order of rows in the result set previously returned to the client matches the result set presently compiled at the backup server node. If the checksum values do not match, then an error condition is identified for the failover/statement handle. In some embodiments, this means that the client will have to re-execute the cursor. If the checksum values match, then the query re-execution is identified as being successful, and the data from the previously executed cursor may continue to be used.

Therefore, what has been described above is an improved approach for database failovers. By calculating the pre-failover checksum on the client systems and the post-failover checksums on the database server, embodiments are able to perform a failover recovery with reduced network traffic and server processing.

Therefore, what has been described above is an improved approach for database session failovers. By calculating the pre-failover checksum on the client systems and the post-failover checksums on the database server, embodiments are able to perform a failover recovery with reduced network traffic and server processing. In addition, additional embodiments for handling scrollable cursors during database session failovers have been disclosed.

System Architecture Overview

FIG. 1 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be stored in a database 1432 on a storage medium 1431 which is accessed through data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for recovering after the failure of a first server to which a client was connected for accessing a resource, the method comprising:
    connecting a client to a first server node to access a resource for using a cursor;
    calculating at the client a first state information for the connection between the client and first server node, wherein the first state information comprises a first checksum;
    detecting a failure, wherein the failure prevents the client from accessing the resource through the first server node;
    automatically connecting the client with a second server node, the second server node configurable to access the resource;
    transmitting the first state information comprising the first checksum from the client to the second server node;
    calculating at the second server node a second checksum; and
    determining whether the client is allowed to continue processing with previously accessed data transmitted from the first server node if the state information indicates consistency with newly accessed data from the second server node, wherein consistency is determined based at least in part upon a comparison between the first checksum and the second checksum.

2. The method of claim 1, wherein the first checksum is based at least in part upon a plurality of rows transmitted to the client from the first server node prior to detecting a failure.

3. The method of claim 1, wherein the second checksum is based at least in part upon a plurality of rows retrieved from the resource by the second server node corresponding to a query associated with the previously accessed data.

4. The method of claim 1, wherein the state information sent by the client to the second server node is a tuple comprising a row count and the first checksum.

5. The method of claim 1, wherein the cursor is a scrollable cursor, and the first and second checksums are order sensitive checksums.

6. The method of claim 5, wherein the state information comprises a list of rows received by the client from the first server node.

7. The method of claim 6, wherein the first checksum is based at least in part upon the list of rows.

8. The method of claim 5, wherein the state information comprises a value corresponding to a highest row of data transmitted from the first server node to the client.

9. The method of claim 8, wherein the first checksum is based at least in part upon all rows up to the highest row of data.

10. The method of claim 1, wherein the first and second checksums are expressed in network byte order or machine neutral format that is independent of an endian-ness of the client and first and second server nodes.

11. A computer program product comprising a non-transitory computer usable medium having executable code to execute a process for recovering after the failure of a server to which a client is connected, the process comprising:
    connecting a client to a first server node to access a resource for using a cursor;
    calculating at the client a first state information for the connection between the client and first server node, wherein the first state information comprises a first checksum;
    detecting a failure, wherein the failure prevents the client from accessing the resource through the first server node;
    automatically connecting the client with a second server node, the second server node configurable to access the resource;
    transmitting the first state information comprising the first checksum from the client to the second server node;
    calculating at the second server node a second checksum; and
    determining whether the client is allowed to continue processing with previously accessed data transmitted from the first server node if the state information indicates consistency with newly accessed data from the second server node, wherein consistency is determined based at least in part upon a comparison between the first checksum and the second checksum.

12. The computer program product of claim 11, wherein the first checksum is based at least in part upon a plurality of rows transmitted to the client from the first server node prior to detecting a failure.

13. The computer program product of claim 11, wherein the second checksum is based at least in part upon a plurality of rows retrieved from the resource by the second server node corresponding to a query associated with the previously accessed data.

14. The computer program product of claim 11, wherein the state information sent by the client to the second server node is a tuple comprising a row count and the first checksum.

15. The computer program product of claim 11, wherein the cursor is a scrollable cursor, and the first and second checksums are order sensitive checksums.

16. The computer program product of claim 15, wherein the state information comprises a list of rows received by the client from the first server node.

17. The computer program product of claim 16, wherein the first checksum is based at least in part upon the list of rows.

18. The computer program product of claim 15, wherein the state information comprises a value corresponding to a highest row of data transmitted from the first server node to the client.

19. The computer program product of claim 18, wherein the first checksum is based at least in part upon all rows up to the highest row of data.

20. The computer program product of claim 11, wherein the first and second checksums are expressed in network byte order or machine neutral format that is independent of an endian-ness of the client and first and second server nodes.

21. A system for recovering after the failure of a server to which a client is connected, the system comprising:

a processor;

a memory comprising computer code executed using the processor, in which the computer code implements connecting a client to a first server node to access a resource for using a cursor; calculating at the client a first state information for the connection between the client and first server node, wherein the first state information comprises a first checksum; detecting a failure, wherein the failure prevents the client from accessing the resource through the first server node; automatically connecting the client with a second server node, the second server node configurable to access the resource; transmitting the first state information comprising the first checksum from the client to the second server node; calculating at the second server node a second checksum; and determining whether the client is allowed to continue processing with previously accessed data transmitted from the first server node if the state information indicates consistency with newly accessed data from the second server node, wherein consistency is determined based at least in part upon a comparison between the first checksum and the second checksum.

22. The system of claim 21, wherein the first checksum is based at least in part upon a plurality of rows transmitted to the client from the first server node prior to detecting a failure.

23. The system of claim 21, wherein the second checksum is based at least in part upon a plurality of rows retrieved from the resource by the second server node corresponding to a query associated with the previously accessed data.

24. The system of claim 21, wherein the state information sent by the client to the second server node is a tuple comprising a row count and the first checksum.

25. The system of claim 21, wherein the cursor is a scrollable cursor, and the first and second checksums are order sensitive checksums.

26. The system of claim 25, wherein the state information comprises a list of rows received by the client from the first server node.

27. The system of claim 26, wherein the first checksum is based at least in part upon the list of rows.

28. The system of claim 25, wherein the state information comprises a value corresponding to a highest row of data transmitted from the first server node to the client.

29. The system of claim 28, wherein the first checksum is based at least in part upon all rows up to the highest row of data.

30. The system of claim 21, wherein the first and second checksums are expressed in network byte order or machine neutral format that is independent of an endian-ness of the client and first and second server nodes.

* * * * *

UNITED STATES PATENT AND TRADEMARK OFFICE
CERTIFICATE OF CORRECTION

| | | |
|---|---|---|
| PATENT NO. | : 9,582,375 B2 | Page 1 of 1 |
| APPLICATION NO. | : 14/272167 | |
| DATED | : February 28, 2017 | |
| INVENTOR(S) | : Bastawala et al. | |

It is certified that error appears in the above-identified patent and that said Letters Patent is hereby corrected as shown below:

In the Specification

In Column 2, Line 43, delete "embodiments;" and insert -- embodiments. --, therefor.

In Column 7, Line 7, delete "i);" and insert -- i). --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*